United States Patent
Pavageau et al.

(10) Patent No.: US 11,416,690 B2
(45) Date of Patent: Aug. 16, 2022

(54) MEMORY CARD READER BODY WITH PROTECTIVE MESH ON BOTH SIDES

(71) Applicant: Banks and Acquirers International Holding, Paris (FR)

(72) Inventors: Stephane Pavageau, La Roche de Glun (FR); Jean-Jacques Delorme, Saint-Marcel-les-Valence (FR); Johann Jadeau, Valence (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 0 days.

(21) Appl. No.: 15/773,407

(22) PCT Filed: Nov. 3, 2016

(86) PCT No.: PCT/EP2016/076612
§ 371 (c)(1),
(2) Date: May 3, 2018

(87) PCT Pub. No.: WO2017/077006
PCT Pub. Date: May 11, 2017

(65) Prior Publication Data
US 2018/0336376 A1    Nov. 22, 2018

(30) Foreign Application Priority Data
Nov. 3, 2015 (FR) .................................. 1560535

(51) Int. Cl.
*G06K 7/00* (2006.01)

(52) U.S. Cl.
CPC .......... *G06K 7/0021* (2013.01); *G06K 7/0078* (2013.01); *G06K 7/0082* (2013.01); *G06K 7/0091* (2013.01)

(58) Field of Classification Search
CPC ................................................... G06K 7/0021
(Continued)

(56) References Cited

U.S. PATENT DOCUMENTS

| 7,174,628 B1 * | 2/2007 | Wang ..................... H05K 3/284 |
| | | 29/830 |
| 7,988,054 B2 | 8/2011 | Garrido-Gadea et al. |

(Continued)

FOREIGN PATENT DOCUMENTS

| DE | 4312905 A1 | 10/1994 |
| FR | 2997530 A1 | 5/2014 |

(Continued)

OTHER PUBLICATIONS

International Search Report dated Jan. 11, 2017 for corresponding International Application No. PCT/EP2016/076612, filed Nov. 3, 2016.

(Continued)

*Primary Examiner* — Rafferty D Kelly
(74) *Attorney, Agent, or Firm* — David D. Brush; Westman, Champlin & Koehler, P.A.

(57) ABSTRACT

A memory card reader body includes proposed, on an internal face, a receiving recess to receive a memory card connector. The receiving recess has electrically conductive tracks forming a protective mesh for the memory card connector. The conductive tracks are such that they also extend on an external face of the memory card reader body through vias passing through the internal and external faces.

15 Claims, 5 Drawing Sheets

(58) Field of Classification Search
USPC .......................................................... 235/441
See application file for complete search history.

(56) References Cited

U.S. PATENT DOCUMENTS

| | | | |
|---|---|---|---|
| 9,530,029 B2 | 12/2016 | Jadeau et al. | |
| 9,871,375 B2 | 1/2018 | Pavageau | |
| 2008/0099559 A1* | 5/2008 | Lo .................... | G06K 19/07741 |
| | | | 235/441 |
| 2011/0048756 A1* | 3/2011 | Shi ....................... | H05K 5/0208 |
| | | | 174/50 |
| 2015/0382455 A1* | 12/2015 | Enevoldsen ......... | H05K 7/1422 |
| | | | 324/705 |

FOREIGN PATENT DOCUMENTS

| | | |
|---|---|---|
| FR | 3012720 A1 | 5/2015 |
| GB | 2411756 A | 9/2005 |

OTHER PUBLICATIONS

English translation of the Written Opinion of the International Searching Authority dated Jan. 11, 2017 for corresponding International Application No. PCT/EP2016/076612, filed Nov. 3, 2016.

* cited by examiner

MEMORY CARD READER BODY WITH PROTECTIVE MESH ON BOTH SIDES

CROSS-REFERENCE TO RELATED APPLICATIONS

This Application is a Section 371 National Stage Application of International Application No. PCT/EP2016/076612, filed Nov. 3, 2016, which is incorporated by reference in its entirety and published as WO 2017/077006 A1 on May 11, 2017, not in English.

1. FIELD OF THE INVENTION

The invention comes within the field of memory card reader devices comprising an integrated circuit board. These memory cards (MCs) are also called smartcards. Such devices are used for example in many apparatuses such as payment terminals, authentication devices or identification devices or again content-reading devices.

More specifically, the invention relates to the securing of a memory card reader body comprising a memory card connector to be mounted in a memory card reader terminal.

2. TECHNOLOGICAL BACKGROUND

We shall strive more particularly in the rest of this document to describe the problems and issues existing in the field of electronic payment terminals that confronted the inventors of the present patent application. The invention is of course not limited to this particular field of application but is of interest for all types of terminals that can include a memory card reader and have to face proximate or similar problems and issues.

In addition to a memory card reader, a memory card reader terminal comprises a certain number of components such as a keypad, a screen, one or more processors, a memory, an electrical power source.

For many years now, memory card reader terminals have seen a great increase in their functions. This is especially true of payment terminals. Thus, in addition to the payment function, the terminals embed network communications functions, contactless card detection functions, token (for example loyalty token) management functions, etc.

In addition to the great increase in such auxiliary functions, memory card reader terminals must withstand various attacks or attempts at fraud to which they are frequently subjected.

Of the aspects related to terminal security, manufacturers in this sector are more particularly interested in protecting the memory card reader. The fact is that a memory card reader is still a relatively weak link in the memory card reader terminal especially because the memory card reader has a slot for the insertion of the memory card, and this slot makes the interior of the terminal accessible from the exterior. More particularly, attackers seek to obtain access to the memory card connector. The memory card connector is that part of the memory card reader that makes contact with the chip or the microprocessor embedded in the memory card.

Referring to FIG. 1, a classic assembly of a memory card reader is described. This memory card reader comprises a memory card reader body 10 provided with an insertion slot 11 for inserting a memory card. The memory card connector is directly integrated into the memory card reader. It comprises connection pins 12 for connection to the printed circuit board (PCB) 13. The PCB 13 also has electronic components 14. The assembly can also include a protective cover 15 that is to be mounted on the reader body, which is itself to be mounted on the PCB through fastening lugs.

When a malicious person succeeds in accessing a memory card connector, he can then envisage the intercepting or reading of data exchanged between the chip or the microprocessor of the memory card and the processor of the memory card reader terminal. Among the pieces of data intercepted, we can cite especially the secret code entered by the customer when the secret code is requested. This secret code can be conveyed without encryption in certain smartcards. These intrusions can take the form of drilling, scratching or any other intrusive technique aimed at shorting, cutting and/or modifying the characteristics of sensitive electrical signals without in any way blocking the terminal (such blocking would make it impossible to carry out any subsequent fraudulent manipulation).

Many efforts have therefore been made to secure memory card readers. Thus, for example, memory card readers are provided with an electrical mesh protection triggered at electrical levels. This protection uses fine, adjacent electrical tracks at least partially covering the part to be protected. For example, one track can be connected to a connection pin of an active signal and the other track can be connected to a connection pin connected to ground. When an object seeks to penetrate the protection enclosure or chamber, a cut-off or a short-circuit is produced causing the terminal to be put out of service. The intrusions can be detected upon levels of voltage or according to the compliance of the signals travelling through these tracks.

As illustrated in FIGS. 2 and 3, the memory card reader body 10 is provided with a receiving recess 18 for receiving the memory card connector 16. The receiving recess 18 comprises electrically conductive tracks 20. This is a thermoplastic injection-molded part into which the electronic circuit tracks 20 are integrated in three dimensions during injection. Such a receiving recess is here below called an MID (Molded Interconnect Device) receiving recess or MID part. The 3D conductive tracks of the MID reception housing act as protective meshes for the memory card connector, especially the memory card I/O (Input/Output) signals travelling between the memory card (smartcard) and the memory card connector. The conductive tracks take the form of loops, each extremity of which ends in a connection pin (or a contact pin). The different connection pins illustrated here are grouped together in a contact zone 22.

To integrate the conductive tracks within the part, a laser etching technique is used for example. Among the known techniques of laser etching, the technique of using a thermoplastic material doped with a plastic metal additive activated by means of a laser is used (this is the technique known as the LDS (Laser Direct Structuring) technique).

Despite the protection measures developed to date, intrusions into the memory card reader body are still being detected. These protection measures do not seem to be sufficiently dissuasive. In particular, the system of conductive tracks forming a protection mesh offers a solution with only a limited level of protection There is a need to provide a solution that further reinforces the level of security of the memory card readers, especially by increasing the time needed to access the sensitive electrical signals of the memory card reader.

3. SUMMARY OF THE INVENTION

In one particular embodiment of the invention, a memory card reader body is proposed comprising, on an internal face, a receiving recess to receive a memory card connector, the receiving recess comprising at least one electrically conductive track forming a protective mesh for the memory card connector, said at least one electrically conductive track extending also on an external face of the memory card reader body by means of at least one via passing through said internal and external faces.

The term "via" is understood to mean an electrically conductive hole that provides the electrical link for one or more conductive tracks between the internal face and the external face of the memory card reader body.

Thus, by extending the conductive track or tracks on the external face of the memory card reader body, the protection mesh according to the invention has a protection surface greater than that of prior art solutions, reducing the possibilities of intrusion by malicious third parties (especially by machining the external face). Indeed, the greater the surface of the conductive track, the greater the chances of detecting fraudulent intrusion. It therefore becomes even more difficult to access the sensitive signals of the memory card reader without triggering a blockage of the reader.

The general principle of the invention therefore relies on the application of an electrical protection mesh configured to be on both sides, improving the level of security against any intrusion by malicious third parties.

According to one particular aspect of the invention, the memory card reader body comprises at least one electrically conductive track of a first type (for example to conduct an active signal), each extremity of which is terminated by a connection pin situated on the internal face, said electrically conductive track of a first type extending from the internal face towards the external face through a first electrically conductive through hole and from the external face towards the internal face through a second electrically conductive through hole.

According to one particular aspect of the invention, the memory card reader body furthermore comprises at least one electrically conductive track of a second type (through the ground), each extremity of which is terminated by a connection pin situated on the internal face, said at least one electrically conductive track of a certain type extending from the internal face to the external face through a third electrically conductive through hole and from the external face to the internal face through a fourth electrically conductive through hole.

According to one particularly advantageous characteristics in terms of security, the external face is covered with a thermosetting (or thermoset) resin.

Thus, it is made very difficult to access sensitive signals through the external face without breaking the electrically conductive tracks. Indeed, the fact that a thermosetting (or thermoset) resin is both hard and brittle makes the conductive tracks easy to break during an intrusion by soldering for example. It is therefore difficult to access the tracks without breaking them. Just like the thermosetting resin, an epoxy or polyurethane type resin can be envisaged.

According to one variant of the invention, the external face is covered with a thermoplastic resin.

Such a resin also reinforces the level of security.

According to one particular characteristic, the memory card reader body furthermore comprises a protective cover mounted on the external face.

A drilling of the cover could lead to a deterioration of the electrical tracks and hence to the terminal being put out of service. The level of security is therefore increased.

According to one particular characteristic, said protective cover is sealed to the external face by means of a thermosetting glue or cyanoacrylate glue.

Thus, it is made even more difficult to access to the sensitive signals without breaking the conductive tracks. Indeed, the fact of trying to remove the cover and damage it leads to the deterioration of the thermosetting glue or cyanoacrylate glue as well of the conductive tracks situated beneath this glue. This characteristic further increases the level of security against any malicious intrusion. It must be noted that the cover can be of the thermoset, thermoplastic or metal type. In the case of a metal cover, it is necessary to provide for a thickness of glue or resin great enough to prevent any interference with the conductive tracks.

According to one particular characteristic, said internal face and/or said external face has at least one area in relief or embossed on which said at least one electrically conductive track extends.

Tracks with a 3D structure are thus obtained, reducing the possibility of machining the external face of the memory card reader. Access to the sensitive signals is difficult because the conductive tracks need to be accessed very slowly. The intrusion time is even further increased.

According to one particular advantageous characteristic, said at least one electrically conductive track takes the form of a loop of a determined geometrical shape.

Another embodiment of the invention proposes a memory card reader comprising the memory card body mentioned here above (in any one of its different embodiments).

Another embodiment of the invention proposes a terminal comprising the above-mentioned memory card reader body (in any one of its different embodiments).

Another embodiment of the invention proposes a method for manufacturing a protective mesh of a memory card connector for a memory card reader body comprising:

the defining of a geometrical shape of at least one electrically conductive track extending on the internal and external faces of said memory card reader body by means of at least through via passing through said internal and external faces;

the defining of a location of said at least one through via;

the obtaining of said at least one conductive track and said at least one through via on the memory card reader body.

The protective mesh thus formed comprises conductive tracks on both sides. The protective surface is increased as compared with the prior-art solutions, reducing the possibilities of external intrusions. The step for obtaining said at least one conductive track can be done by means of a laser-etching technique, for example an LSD technique. The step for obtaining at least one through via can be done by mechanical drilling or by a molding of the memory card reader body.

4. LIST OF FIGURES

Other features and characteristics of the invention shall appear from the following description, given by way of an indicative and non-exhaustive example, and from the appended drawings of which:

FIG. 1, already described with reference to the prior art, shows a classic example of the architecture of a memory card reader before assembly;

FIGS. 2 and 3, already described with reference to the prior art, present an example of a classic architecture of a memory card reader body provided with a memory card connector;

FIGS. 4A and 4B present a top view and a bottom view of a memory card reader body according to one particular embodiment of the invention;

FIGS. 5A, 5B, 5C, 5D each illustrate a simplified example of the electrical diagrams of a protective mesh according to the invention, comprising four through vias;

5. DETAILED DESCRIPTION

In all the figures of present document, the identical elements and steps are designated by one and the same numerical reference.

We shall strive more particularly in the following description to describe the invention in the context of electronic payment terminals. The invention of course is not limited to this particular field of application but is of interest for any type of terminal that can include a memory card reader.

Figure 1:
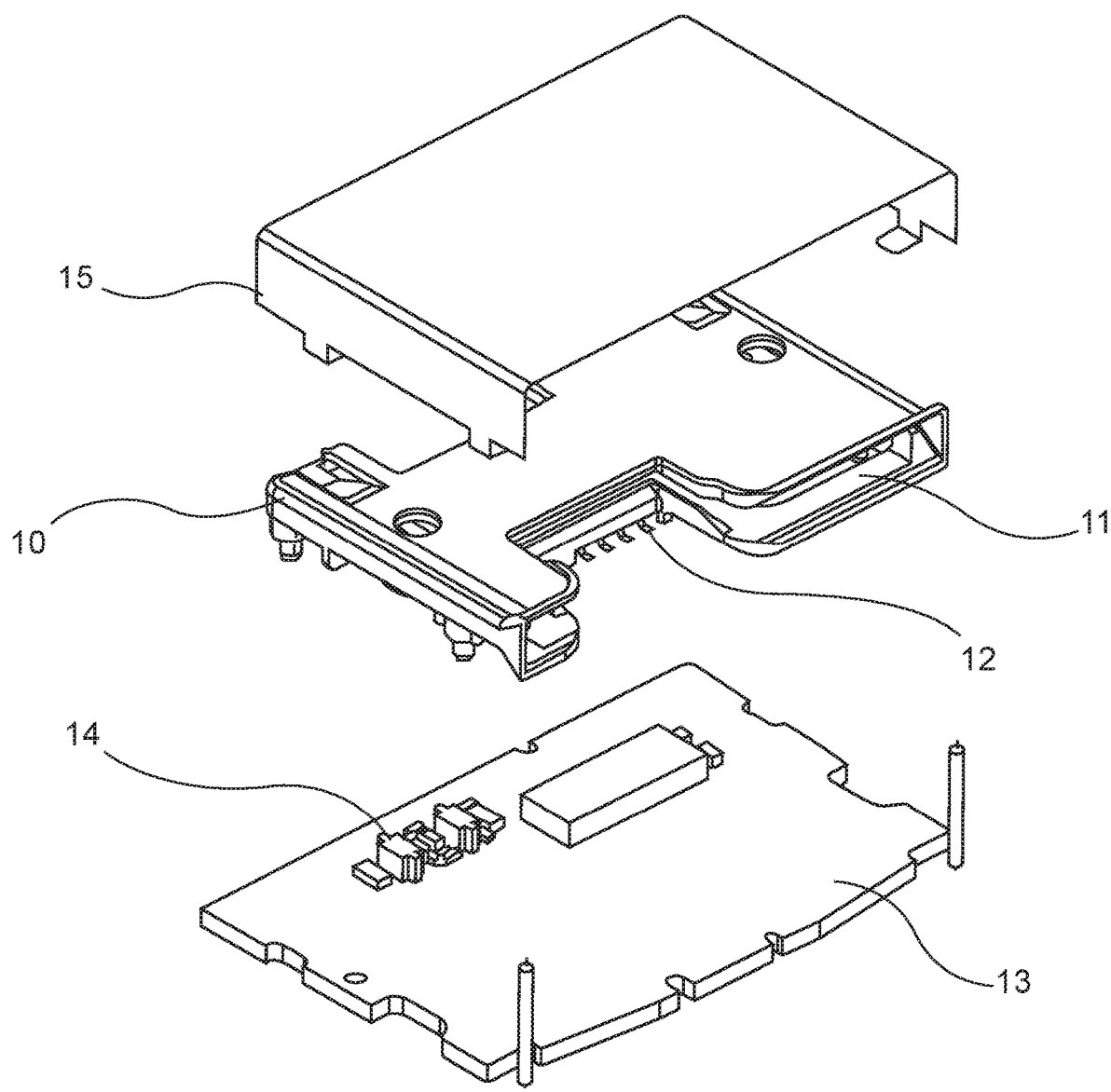
Figure 2:
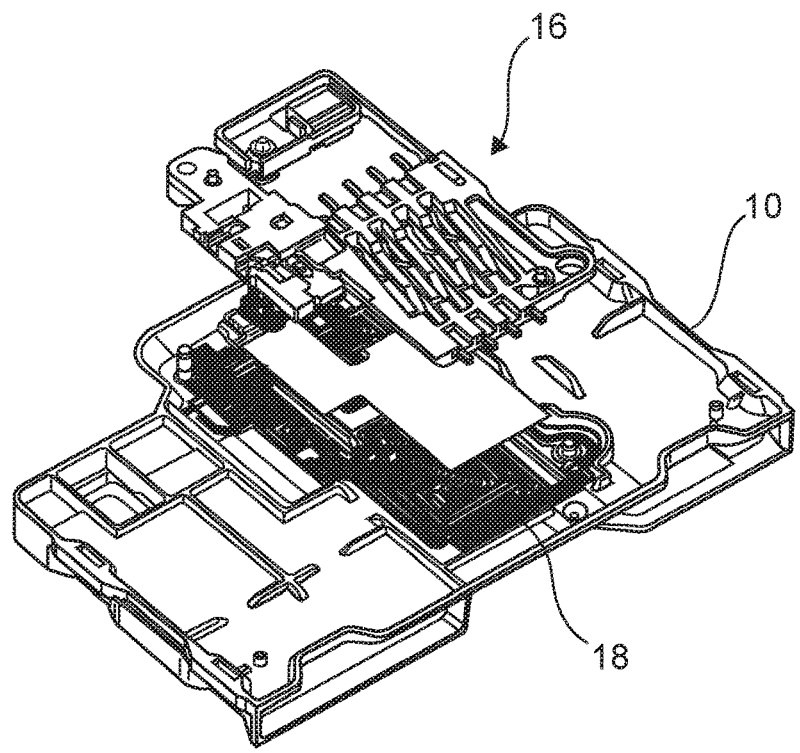
Figure 3:
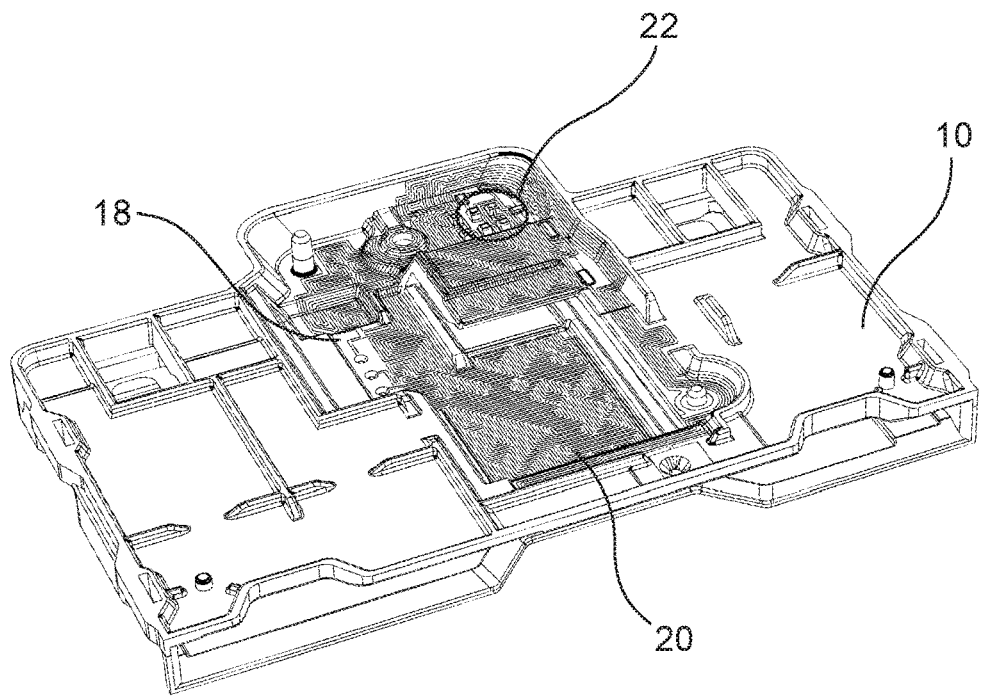
Figure 4A:
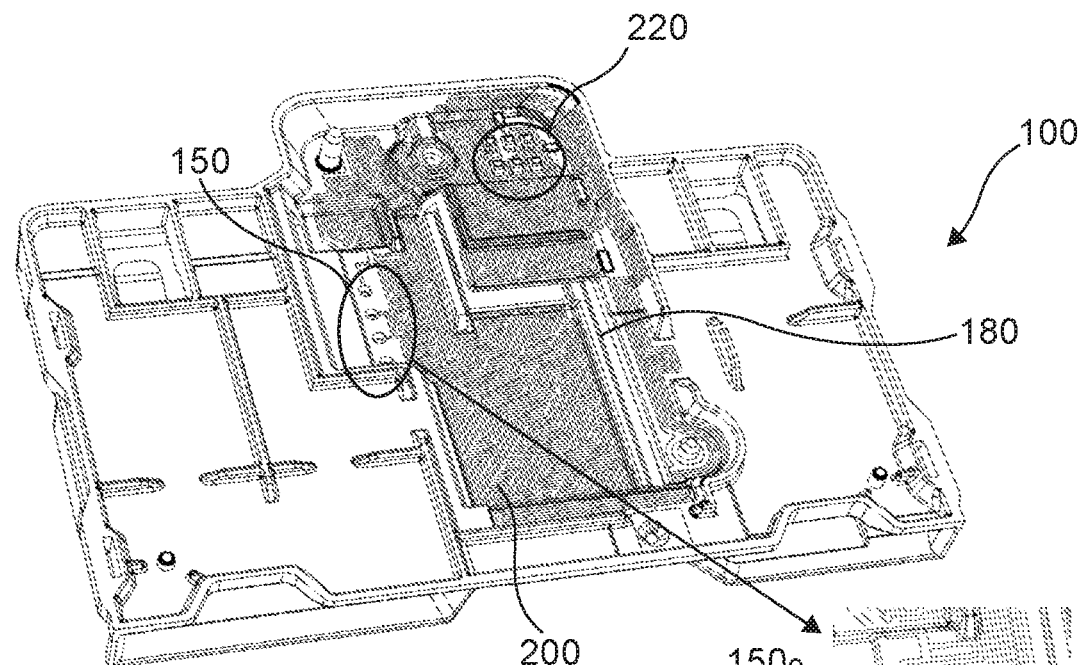
Figure 4B:
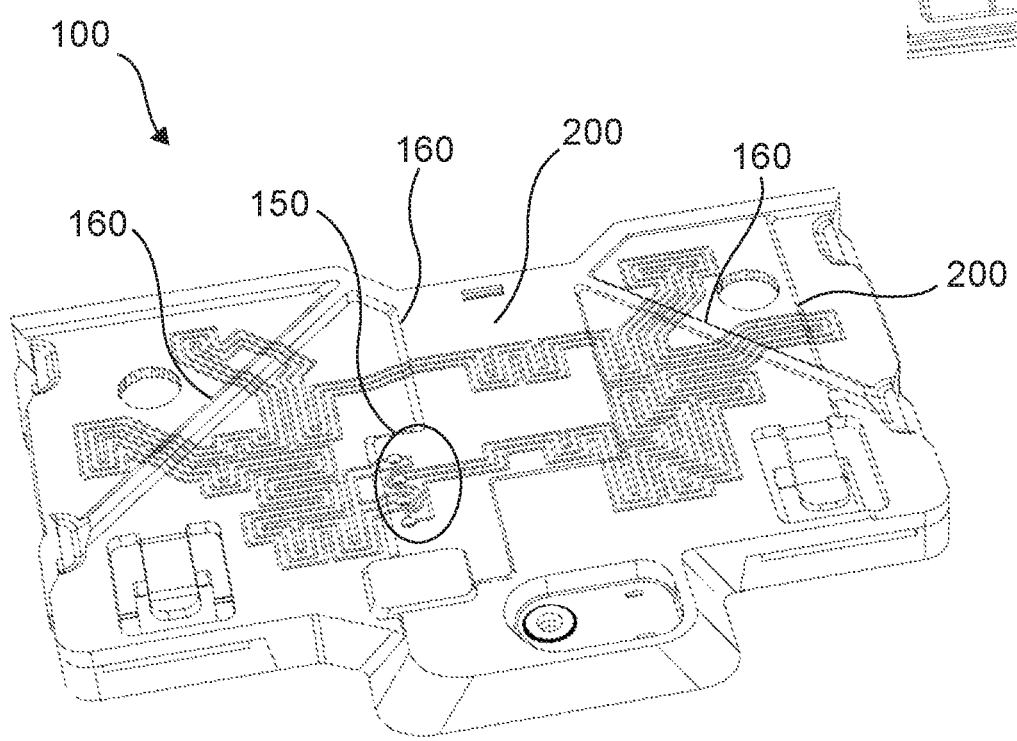

The general principle of the invention relies on the implementing of an electrical protective mesh configured on both sides on the memory card reader body as illustrated in FIGS. 4A and 4B.

The top view illustration in FIG. 4A shows the internal face of a memory card reader body 100 and the top view illustrated in FIG. 4B shows the external face of the memory card reader body 100 according to one particular embodiment of the invention. The internal face is the face to which the connector of said memory card gets attached.

The memory card reader body 100, which has a generally rectangular parallelepiped shape, comprises a receiving recess 180 on its internal face for receiving a memory card connector. The receiving recess 180 has a pre-determined volume shape: it enables protection of the memory card connector from external intrusion while at the same time creating the space needed for the insertion and the reading of a smartcard type of memory card. The receiving recess 180 comprises a plurality of electrically conductive tracks 200 forming a protective mesh for the memory card connector. As illustrated in the figure, the conductive tracks 200 are laid out on the internal face in such a way that the protective mesh generally covers the surface of the receiving recess 180 that is to receive the memory card connector. Each conductive track takes the form of a loop, each end of which terminates in a contact pin (or connection pin).

The receiving recess 180 furthermore comprises, on its internal surface, a contact zone (or connection zone) 220 in which the contact pins of the protective mesh are grouped together. The contact zone 220 is intended for connection to the memory card connector. Once the memory card connector is integrated into the receiving recess 180, the contact pins are connected to the electronic circuit, which ensures the operation of the electronic payment terminal, by means of an elastomer connector, for example of the Zebra (registered mark) type. For example, the contact zone comprises six contact pins 220 as shown in FIG. 4A.

According to the invention, the conductive tracks 200 extend without interruption on the external face of the memory card reader body 100 by means of electrically conductive through holes (also called vias here below) so as to extend the protective mesh from the internal face towards the external face of the memory card reader body 100. The through vias are illustrated by the encircled area referenced 150. Each via is a through hole providing the electrical link from a conductive track of the internal face (the "front face) towards the external face (the "back" face" or from the external face (the "back" face) towards the internal face (the "front" face). Thus; since the protective mesh is dual-faced (i.e. "front/back)), it has a protective surface that is greater than that of the prior art solutions, reducing the possibilities of intrusion by malicious third parties (especially by the machining of the external face).

The vias in the present example are grouped together within a same area of the memory card reader body 100. Naturally, this is an illustrative example and other configurations can be envisaged without departing from the context of the invention. For example, the vias can be distributed disparately on the faces of the memory card reader body 100.

The conductive tracks 200 are laid out on the external face in such a way that the protective mesh appreciably covers the entire external surface of the memory card reader body. Indeed, the greater the surface covered by the conductive tracks 200, the greater is the level of detection of intrusions. The tracks have a geometrically pre-determined shape.

The conductive tracks 200 are printed on both faces of the memory card reader body 100 by means of a laser-etching technique such as the LDS technique for example.

In the example illustrated herein, the receiving recess 180 comprises two conductive loops: a first type of loop dedicated to the transmission of the active input/output signal (denoted as I/O in the figure) and a second type of loop dedicated to setting up a reference potential, also called a ground (denoted as GND in the figure). As explained further above, each loop extremity terminates in a connection pin.

The first I/O conductive loop extends without interruption from the internal face to the external face of the reader body by means of a first through via $150_2$ and from the external face to the internal face by means of a second through via 150.

The second conductive loop GND extends without interruption from the internal face to the external face of the reader body by means of a third through via $150_1$ and from the external face to the internal face by means of a fourth through via $150_4$.

In order to increase the chances of detecting fraudulent intrusion, the surface of the memory card reader body is designed so as to have, on its external face and/or its internal face, one or more features in relief on which there extend the electrical tracks 200. These features in relief can take the form of breaks or steps 160 thus enabling the forming of protective mesh with a 3D structure.

We refer now to FIGS. 5A, 5B, 5C and 5D each of which illustrates an example of a simplified electrical diagram of a protective mesh according to the invention, implementing four through vias. This is a protective mesh situated on the external face of the memory card reader body.

Figure 5A:
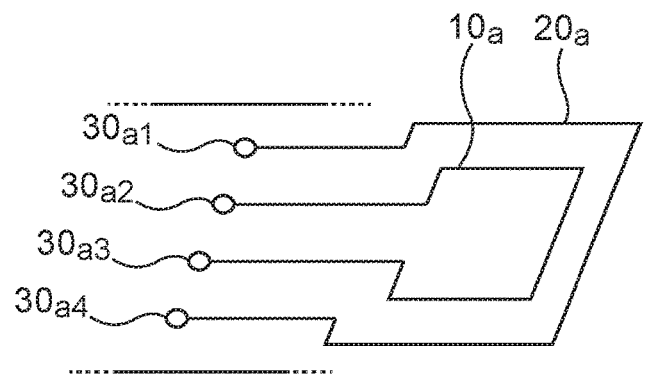
Figure 5B:
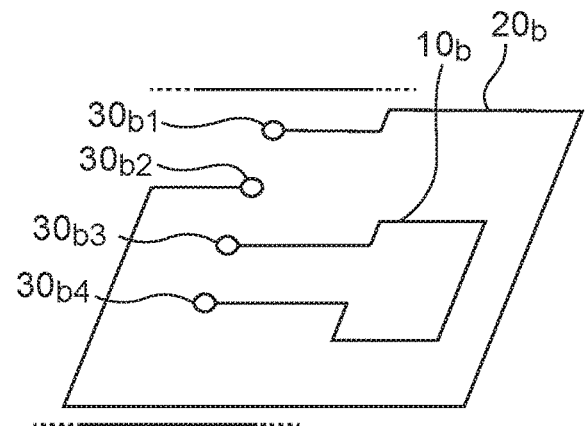
Figure 5C:
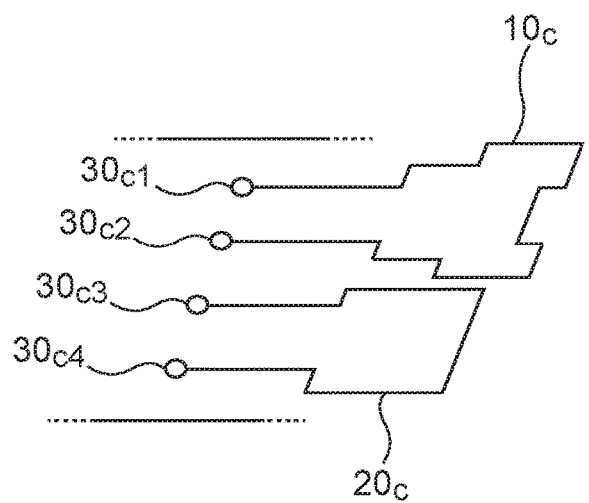
Figure 5D:
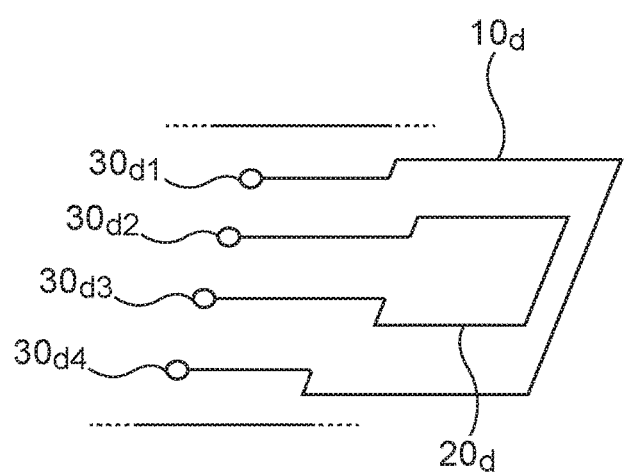

Referring to FIG. 5A:
the conductive track 10a which corresponds to the input-output signal I/O extends without interruption from the internal face to the external face of the reader body in passing through the through vias $30a_2$ and $30a_3$ and
the conductive track 20a extends without interruption from the internal face to the external face of the reader body in passing through the through vias $30a_1$ and $30a_4$. Referring to FIG. 5B:
the conductive track 10b which corresponds to the input-output signal I/O extends without interruption from the internal face to the external face of the reader body in passing through the through vias $30b_2$ and $30b_3$ and the conductive track 20b extends without interruption from the internal face to the external face of the reader body in passing through the through vias $30b_1$ and $30b_4$.
Referring to FIG. 5C:
the conductive track 10c which corresponds to the input-output signal I/O extends without interruption from the internal face to the external face of the reader body in passing through the through vias $30c_2$ and $30c_3$ and
the conductive track 20c extends without interruption from the internal face to the external face of the reader body in passing through the through vias $30c_1$ and $30c_4$.
Referring to FIG. 5D:
the conductive track 10d which corresponds to the input-output signal I/O extends without interruption from the internal face to the external face of the reader body in passing through the through vias $30d_2$ and $30d_3$ and
the conductive track 20d extends without interruption from the internal face to the external face of the reader body in passing through the through vias $30d_1$ and $30d_4$.

In these configurations, the reader body has a set of four through vias and two conductive loops.

It will be understood that, by means of the through vias, the conductive loop I/O and the conductive loop GND traditionally laid out on the internal face of the memory card reader body are extended at least partially on the external face of said body.

Figure 6:
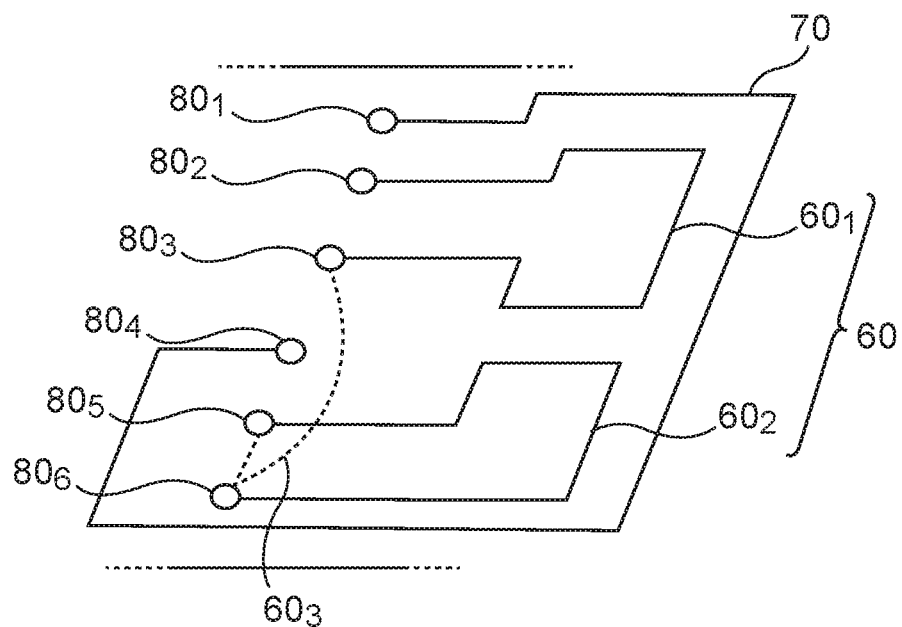
FIG. 6 illustrates another simplified example of a schematic electrical diagram of a protective mesh according to the invention, comprising six through vias.

FIG. 6 illustrates another example of a simplified electrical diagram of a protective mesh according to the invention implementing six through vias.

The conductive track 70 represents the ground and passes through the through vias $80_1$ and $80_4$. The conductive track 60 represents the active input-output I/O signal. The conductive track 60 consists of a first track portion $60_1$ (Mesh In) situated on the external face of a second track part $60_2$ situated on the internal face of a third track part $60_3$ (Mesh Out) situated on the external face. The passages of the track 60 from the internal face to the external face or the external face to the internal face are provided by through vias $80_2$, $80_4$, $80_6$, $80_6$. The second track part $60_2$ forms a bridge between the internal face enabling the electrical connection of the first and third track parts situated on the external face of the memory card reader body. This particular configuration further slows down attacks by malicious third parties because it is not possible, by shorting a track part (or loop part), to deactivate the entire track of (or the entire loop).

This particular solution furthermore shows that by increasing the number of through vias while preserving the number of signals or loops (one ground and one I/O signal), the number of electrical configurations that can be envisaged increases in a combinatory manner.

These are of course examples given purely by way of an illustration. Other electrical configurations based on the same principle can be envisaged without departing from the framework of the invention.

In addition, the external face of the memory card reader body 100 is covered with an opaque thermosetting protective resin (for example a two-component epoxy resin of the LOCTITE 9497, LOCTITE 9466 or LOCTITE 9464 type). Thus, accessing sensitive signals through the external face without breaking the conductive tracks is made extremely difficult. Indeed, a thermosetting resin is both hard and brittle. The opaqueness of the resin makes the conductive tracks non-visible through this resin. A thermoplastic protective resin can also be envisaged as a variant of implementation, but it nevertheless has the defect of being easily deteriorated by heat. An acrylate type resin fulfilling the same function can also be used within the framework of the invention.

Figure 7:
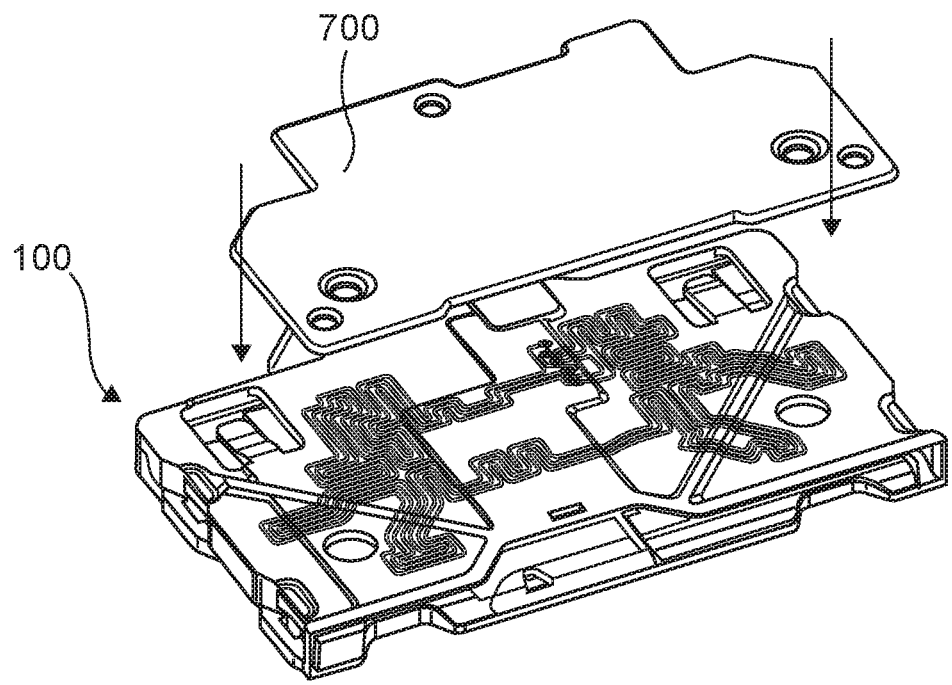
FIG. 7 illustrates the memory card reader body of FIGS. 4A and 4B provided with a protective cover according to one particular embodiment of the invention.

As illustrated in FIG. 7, the memory card reader body 100 can include a protective cover 700 mounted on its external face. The cover can be sealed to the external face by means of a thermosetting glue or cyanoacrylate glue (for example of the CYANO 406 type). The cover can be made out of thermosetting or thermoplastic material. It is also possible to envisage making the cover out of metal. In this case, it is necessary to plan for a thickness of glue or resin that is great enough to prevent any interference between the cover and the conductive tracks.

Those skilled in the art will choose the material of the reader body (at least on its external face side) so that it is compatible in terms of adhesion with the resin or the glue used to protect the reader body. Similarly, the material of the cover will be chosen in such a way that it is compatible with the resin or the glue used.

Finally, we describe here below the main steps of the method for manufacturing a protective mesh for a memory card reader body according to one particular embodiment of the invention. First of all, a geometrical shape is defined for the electrically conductive tracks extending on the internal and external faces of the memory card reader body. The location of the vias passing through said internal and external faces is also defined. Then, said conductive tracks are made by means of a laser-etching technique (LSD for example) on the internal and external faces of the memory card reader body along with the through vias, using a mechanical drilling or laser drilling operation. The protective mesh thus formed includes conductive tracks on both sides. The protection surface is thereby increased as compared with the prior art solutions, reducing the possibilities of external intrusion. It must be noted that the geometrical shape of the tracks and the location of the vias can be chosen respectively from among a plurality of predetermined geometrical shapes and a plurality of predetermined locations. This makes it external intrusions even more difficult to carry out.

The invention claimed is:

1. A memory card reader body comprising:
   an internal face and an external face, wherein the internal face and the external face form opposing sides of the memory card reader body;
   a receiving recess formed on the internal face;
   a memory card connector within the receiving recess and attached to the internal face; and
   at least one electrically conductive track, each of which forms a conductive path that extends over the internal face, through the internal and external faces through at least one via, and over the external face,
   wherein:
      when a smartcard having a chip is inserted into the receiving recess, an electrical connection is made between the chip and the memory card connector, and signals may be communicated from the chip through the electrical connection and the at least one electrically conductive track; and
      the at least one conductive track forms a dual-faced protective mesh for the memory card connector.

2. The memory card reader body according to claim 1, wherein one of the at least one electrically conductive track is an active-signal-conducting type track, each extremity of which is terminated by a connection pin situated on the internal face, said active-signal-conducting type track extending from the internal face to the external face through a first electrically conductive via and from the external face to the internal face through a second electrically conductive via.

3. The memory card reader body according to claim 1, wherein one of the at least one electrically conductive track is a ground type track, each extremity of which is terminated by a connection pin situated on the internal face, said ground type track extending from the internal face to the external face through a third electrically conductive via and from the external face to the internal face through a fourth electrically conductive via.

4. The memory card reader body according to claim 1, wherein the external face is covered with a thermosetting resin.

5. The memory card reader body according to claim 1, wherein the external face is covered with a thermoplastic resin.

6. The memory card reader body according to claim 1, comprising a protective cover mounted on the external face.

7. The memory card reader body according to claim 6, wherein said protective cover is sealed to the external face by a thermosetting glue or cyanoacrylate glue.

8. The memory card reader body according to claim 1, wherein said internal face and/or said external face has at least one area in relief on which at least one of the at least one electrically conductive track extends.

9. The memory card reader body according to claim 1, wherein each of said at least one electrically conductive track takes the form of a loop having a determined geometrical shape.

10. A memory card reader comprising the memory card reader body according to claim 1.

11. A terminal comprising the memory card reader according to claim 10.

12. A method for manufacturing a dual-faced protective mesh of a memory card connector for a memory card reader body having an internal face and an external face, wherein the internal face and the external face form opposing sides of the memory card reader body, the method comprising:
  defining a geometrical shape of at least one electrically conductive track;
  defining a location of said at least one through via;
  forming said at least one conductive track having the geometrical shape and forming a conductive path that extends over the internal face, through the internal and external faces through at least one via, and over the external face to form the protective mesh; and
  connecting the at least one electrically conductive track to the memory card connector, which is received within a receiving recess of the internal face and attached to the internal face,
  wherein when a smartcard having a chip is inserted into a receiving recess formed on the internal face, an electrical connection is made between the chip and the memory card connector, and signals may be communicated from the chip through the electrical connection and the at least one electrically conductive track.

13. The memory card reader body of claim 1, wherein each of the at least one electrically conductive track includes a pair of ends, each of which terminates at a contact pin.

14. The memory card reader body of claim 13, wherein the memory card connector is connected to at least one of the contact pins.

15. A memory card reader comprising:
  a memory card reader body comprising:
    an internal face and an external face, wherein the internal face and the external face form opposing sides of the memory card reader body;
    a receiving recess formed on the internal face;
    a memory card connector within the receiving recess and attached to the internal face; and
    at least one electrically conductive track, each of which forms a conductive path that extends over the internal face, through the internal and external faces through at least one via, and over the external face; and
  card reader electronics connected to the memory card connector,
  wherein:
    when a smartcard having a chip is inserted into the receiving recess, an electrical connection is made between the chip and the memory card connector, and signals may be communicated from the chip through the electrical connection and the at least one electrically conductive track to the card reader electronics; and
    the at least one conductive track forms a dual-faced protective mesh for the memory card connector.

* * * * *